United States Patent
Shenouda

(10) Patent No.: US 12,085,428 B2
(45) Date of Patent: Sep. 10, 2024

(54) METHODS AND DEVICES FOR MEASURING MASS FLOW OF GASEOUS FLUIDS

(71) Applicant: PRATT & WHITNEY CANADA CORP., Longueuil (CA)

(72) Inventor: Antwan Shenouda, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 400 days.

(21) Appl. No.: 17/474,548

(22) Filed: Sep. 14, 2021

(65) Prior Publication Data

US 2023/0078572 A1 Mar. 16, 2023

(51) Int. Cl.
*G01F 1/58* (2006.01)
*G01F 1/60* (2006.01)

(52) U.S. Cl.
CPC ............... *G01F 1/582* (2013.01); *G01F 1/60* (2013.01)

(58) Field of Classification Search
CPC ..................................... G01F 1/582; G01F 1/60
USPC ..................................................... 73/861.11
See application file for complete search history.

(56) References Cited

U.S. PATENT DOCUMENTS

| | | | |
|---|---|---|---|
| 2,149,847 A * | 3/1939 | Kolin | G01F 1/58 310/11 |
| 3,842,670 A | 10/1974 | Brain | |
| 4,152,935 A | 5/1979 | Nagaishi et al. | |
| 4,381,679 A | 5/1983 | Lombard | |
| 8,091,433 B2 | 1/2012 | Colby et al. | |
| 2009/0166555 A1 | 7/2009 | Olson et al. | |
| 2019/0346298 A1 | 11/2019 | Elias | |

FOREIGN PATENT DOCUMENTS

| | | | | |
|---|---|---|---|---|
| DE | 10322550 | | 12/2004 | |
| DE | 10322550 A1 | * | 12/2004 | ............... G01F 1/58 |
| DE | 102018116918 | | 1/2020 | |
| DE | 102018116918 A1 | * | 1/2020 | |
| SU | 1636775 | | 3/1991 | |
| WO | WO-9318372 A1 | * | 9/1993 | ........... G01F 1/3227 |

OTHER PUBLICATIONS

Translation of DE-10322550-A1 (Year: 2004).*
Translation of DE-102018116918-A1 (Year: 2020).*
Extended European Search Report, EP22195725.1, Feb. 1, 2023.

* cited by examiner

*Primary Examiner* — Nathaniel T Woodward
(74) *Attorney, Agent, or Firm* — Norton Rose Fulbright Canada LLP

(57) ABSTRACT

A flowmeter for gaseous fluid includes a conduit composed of non-electrically conductive material for passage of an ionized flow of the gaseous fluid therethrough. The flowmeter further includes an electromagnetic sensor arranged to measure a magnetic field generated about the conduit by the passage of the ionized flow and generate a signal proportional to the magnetic field.

18 Claims, 6 Drawing Sheets

METHODS AND DEVICES FOR MEASURING MASS FLOW OF GASEOUS FLUIDS

TECHNICAL FIELD

The disclosure relates generally to flowmeters and, more particularly, to flowmeters for gaseous fluids.

BACKGROUND OF THE ART

Aircraft engines may be provided with various flowmeters to measure the flow rate of the various fluids used in the engine. Various types of flowmeters exist, such as flowmeters based on hydrodynamic methods, flowmeters with continuously moving bodies, and flowmeters based on various physical phenomena. However, flowmeters based on certain physical phenomena may be limited to measuring the flow rate of liquids.

Using alternative fuels such as hydrogen in gas turbine engines can pose certain design/engineering challenges, which are not encountered when jet fuels are used. For example, certain alternative fuels, such as hydrogen, can be gaseous at atmospheric conditions and thus may need to be stored and/or conveyed in gaseous form. As such, any on-board flowmeters for measuring the mass flow of the aircraft's fuel must be capable of measuring the flow rate of gaseous fluids. As such, improvements are desired.

SUMMARY

In one aspect, there is provided a flowmeter for gaseous fluid. The flowmeter includes a conduit composed of non-electrically conductive material for passage of an ionized flow of the gaseous fluid therethrough. The flowmeter further includes an electromagnetic sensor arranged to measure a magnetic field generated about the conduit by the passage of the ionized flow and generate a signal proportional to the magnetic field.

In another aspect, there is provided an engine arrangement. The engine arrangement includes an ionizer arranged for ionizing a gaseous fuel into an ionized flow, an non-electrically conductive conduit receiving the ionized flow therethrough, an electromagnetic sensor arranged to measure a magnetic field generated about the conduit by the ionized flow and generate a signal proportional to the magnetic field, and a de-ionizer arranged downstream from the electromagnetic sensor for neutralizing the ionized flow.

In a further aspect, there is provided a method for measuring mass flow of a gaseous fluid. An ionized flow of the gaseous fluid is received in an non-electrically conductive conduit. A magnetic field generated about the conduit by the ionized flow is measured. generating a signal proportional to the magnetic field is generated. The signal proportional to the magnetic field is converted to a mass flow of the gaseous fluid.

DESCRIPTION OF THE DRAWINGS

Reference is now made to the accompanying figures in which.

DETAILED DESCRIPTION

The present disclosure is directed to measuring the mass flow of gaseous fluids, for example as used in a hydrogen fuel cell. The properties of gaseous fluids differ from the properties of liquids. For example, gaseous fluids are compressible whereas liquids are not. The compressibility of gaseous fluids makes it difficult to measure its mass flow using traditional flowmeters suitable for liquids. Therefore, there are described herein methods, systems and devices for measuring gaseous fluids.

Figure 1:
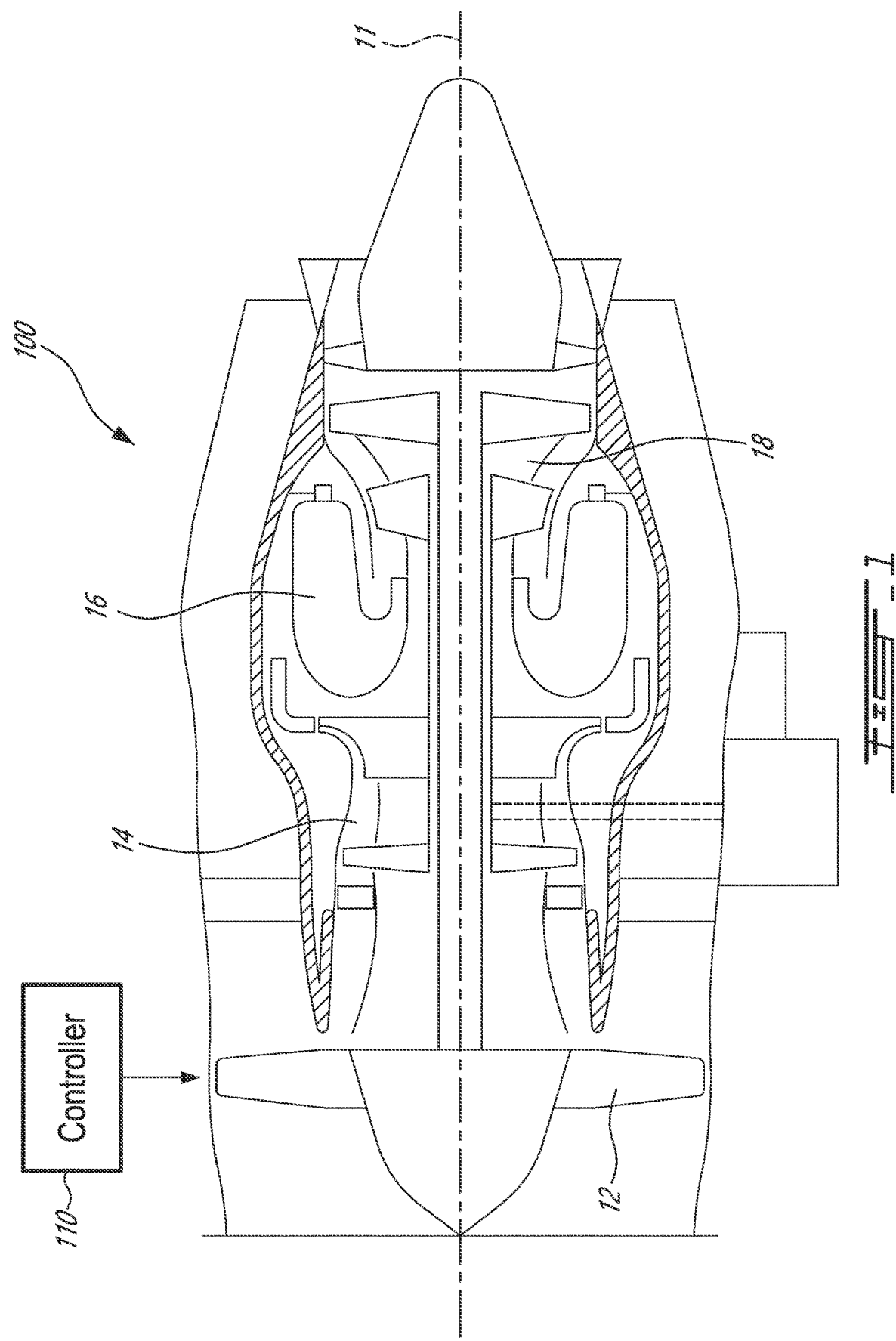
FIG. 1 is a schematic cross sectional view of an example gas turbine engine.

In some embodiments, the gaseous fluid is gaseous fuel used by an engine. As used herein, "gaseous fuel" refers to fuels that exist in the gaseous state at room temperature. Examples of gaseous fuels are hydrogen gas, natural gas, butane and propane. FIG. 1 illustrates an example engine 100 of a type provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. A longitudinal main engine axis 11 extends through the center of the engine 100. Although a turbofan engine 100 is shown in FIG. 1 for exemplary purposes, it is to be understood that the engine 100 as described herein may alternately be another type of gas turbine engine, including for example turboshafts, turboprops, and turbojets, or another type of combustion engine, such as a Wankel engine or a reciprocating engine. As such, the expression "combustor" should be understood to include any chamber within an engine in which combustion can occur. In some embodiments, the engine 100 forms part of an aircraft. In some embodiments, the engine 100 forms part of a vehicle for land or marine applications. In some embodiments, the engine 100 is used in an industrial setting, for example for power generation or as an auxiliary power unit.

Engine 100 may be powered in part or entirely by gaseous fuel. Engine 100 may also be a hybrid or bi-fuel propulsion system, in which two different fuel types (e.g. an alternative fuel such as hydrogen, as well as a traditional jet fuel) may be used.

Control of the operation of the engine 100 can be effected by one or more control systems, for example a controller 110, which is communicatively coupled to the engine 100. The operation of the engine 100 can be controlled by way of one or more actuators, mechanical linkages, hydraulic systems, and the like. The controller 110 can be coupled to the actuators, mechanical linkages, hydraulic systems, and the like, in any suitable fashion for effecting control of the engine 100. The controller 110 can modulate the position and orientation of variable geometry mechanisms within the engine 100, the bleed level of the engine 100, and fuel flow, based on predetermined schedules or algorithms. Note that the controller 110 can be implemented as part of a full-authority digital engine controls (FADEC) or other similar device, including electronic engine control (EEC), engine control unit (ECU), electronic propeller control, propeller control unit, and the like.

Figure 2:
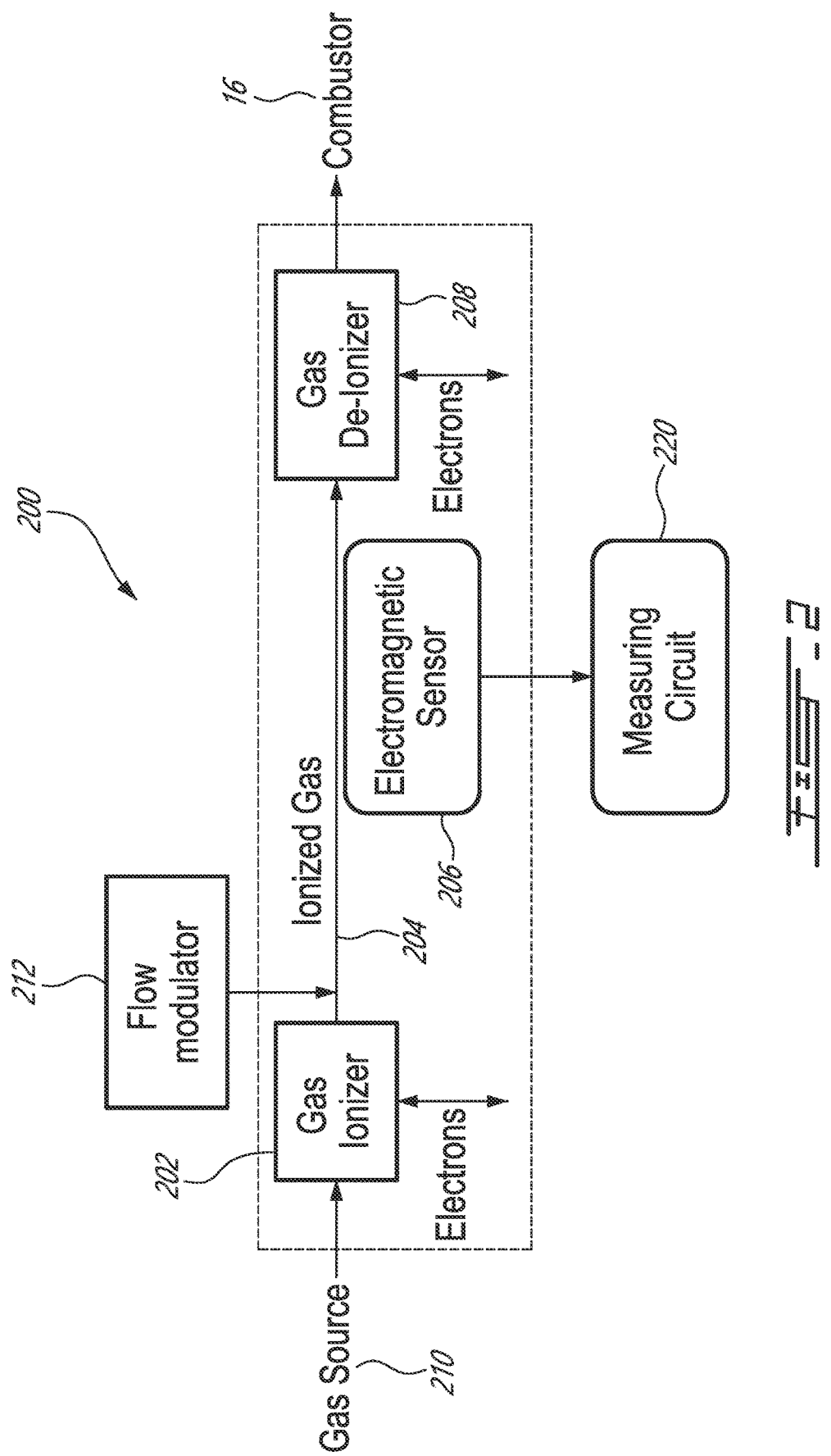
FIG. 2 is a block diagram of an example flowmeter.

Referring to FIG. 2, there is shown an example of a flowmeter 200 for measuring the mass flow rate of a gaseous fluid. The flowmeter 200 measures gas flow in a manner similar to the external measurement of electric current, where charged particles (i.e. electrons) move in a fixed space and result in a magnetic field surrounding a conductor. This principle is reproduced in gas particles by the flowmeter 200, whereby a charged gas flows through a non-electrically conductive conduit 204 and an electromagnetic sensor 206 measures a resulting magnetic field. In some embodiments, and as shown in FIG. 2, flowmeter 200 is configured for measuring the flow rate of gaseous fuel used in engine 100. In cases where flowmeter 200 measures the mass flow rate of the engine's fuel, the flowmeter 200 may be positioned upstream of combustor 16. Alternatively, the flowmeter 200 may be positioned elsewhere in the engine 100.

Ionized gas flowing through the conduit 204 made of non-electrically conductive material generates a magnetic field about the conduit 204. The non-electrically conductive material may be, for example, an insulative material or a non-insulative material that is non-electrically conductive such as a semi-conductor material. In some embodiments, the gaseous fluid is provided to a gas ionizer 202 from a gas source 210. In some embodiments, the gas source 210 may be the engine's primary fuel tank. In other embodiments, the gas source 210 may be another source for the gas whose flow is to be measured. In use, gas particles from the gas source 210 are sent to the gas ionizer 202 to impart a positive or negative charge to the gas, producing a charged gas (i.e. a plasma). If the gaseous fluid is already ionized, the gas ionizer 202 may be omitted. The positively or negatively charged gas is then directed through the conduit 204, where the electromagnetic sensor 206 is arranged to measure the magnetic field generated about the conduit by the passage of the ionized flow and to generate a signal, such as voltage or current, proportional to the magnetic field. The generated signal may then be used to determine the mass flow of the gas via a measuring circuit 220. In some cases, the measuring circuit 220 may be omitted, whereby the output of the flow meter is the signal generated by the electromagnetic sensor 206. In some cases the charged gas may be sent to a de-ionizer 208 for neutralization after the magnetic field has been measured. Alternatively, the de-ionizer 208 may be omitted.

Various types of gas ionizers 202 may be contemplated to ionize the gas molecules, utilizing methods such as electric discharge, laser ionization, or the application of very high electric or magnetic fields. In some embodiments, electrons may be stripped away from the gas molecules, resulting in positively charged ions. In other embodiments, electrons may be added to the gas molecules, resulting in positively charged ions. In either case, energy must be provided to either add or remove one or more electron from each gas particle, resulting in electrically charged gas particles, also referred to as gas ions or plasma. Power is supplied to the gas ionizer 202 in order to ionize the gas particle, for instance from a battery or other power source within engine 100. The power source may be dedicated to the flowmeter 200 or shared, for example a battery from a hybrid engine. The quantity of power required may depend on factors such as the type and quantity of gas being ionized.

Various types of electromagnetic sensors 206 may be contemplated. For instance, the electromagnetic sensor 206 may be a Hall effect sensor, an anisotropic magneto-resistive (AMR) sensor, a giant magnetoresistance (GMR) sensor, or a transformer. In embodiments where the electromagnetic sensor 206 is suitable for measuring an alternating current (AC), such as a transformer, the flowmeter 200 may further include a flow modulator 212 upstream from the electromagnetic sensor 206 to pulse the gaseous fluid and produce the alternating current in the conduit 204. Other devices capable of measuring the magnitude of the magnetic field generated by the flow of ions through the conduit 204 and, in response, produce a proportional signal may be contemplated as well. To prevent the ions from prematurely recombining with electrons in the conduit 204 before a proper reading is taken, the conduit 204 is made of a non-electrically conductive material.

The gas de-ionizer 208, also referred to as a gas neutralizer, is operable to de-ionizer or neutralize the ionized gas after it has passed through the conduit 204 and the generated magnetic field is measured. Various means for neutralizing the gas, i.e. adding electrons to the positively charged plasma or removing electrons from the negatively charged plasma, may be contemplated. In some cases, the gas de-ionizer 208 may be omitted, i.e. the flowmeter 200 may output a flow of ionized gas to be used in its charged state.

The measurement circuit 220 is coupled to the electromagnetic sensor for receipt of the voltage generated by electromagnetic sensor 206 and conversion of this voltage to a mass flow of the ionized gaseous fluid flowing through the conduit 204. In some cases, the mass flow rate of the gas is directly proportional to the outputted signal from the electromagnetic sensor 206, which itself is proportional to the magnitude of the magnetic field generated by the flow of ions through the conduit 204. In other cases, various scale factors or ratios may be used to calculate the mass flow of the gas from the outputted signal. In some embodiments, the signal is converted to mass flow using:

$$Y = MX + B$$

Where Y is the mass flow, X is the measured parameter (in millivolts, volts, amps, milliamps, etc), M is a scale factor and B is an offset. Any electronic component suitable for converting a measured signal to mass flow may be used, such as but not limited to a microcontroller, a field programmable gate array (FPGA), a complex programmable logic device (CPLD), and a field programmable analog array (FPAA). In some embodiments, the measuring circuit 220 is integrated into the engine controller 110. In some embodiments, the engine controller 110 may be configured to control the flow of the gaseous fuel based on the mass flow as measured by the flowmeter 200.

Figure 3:
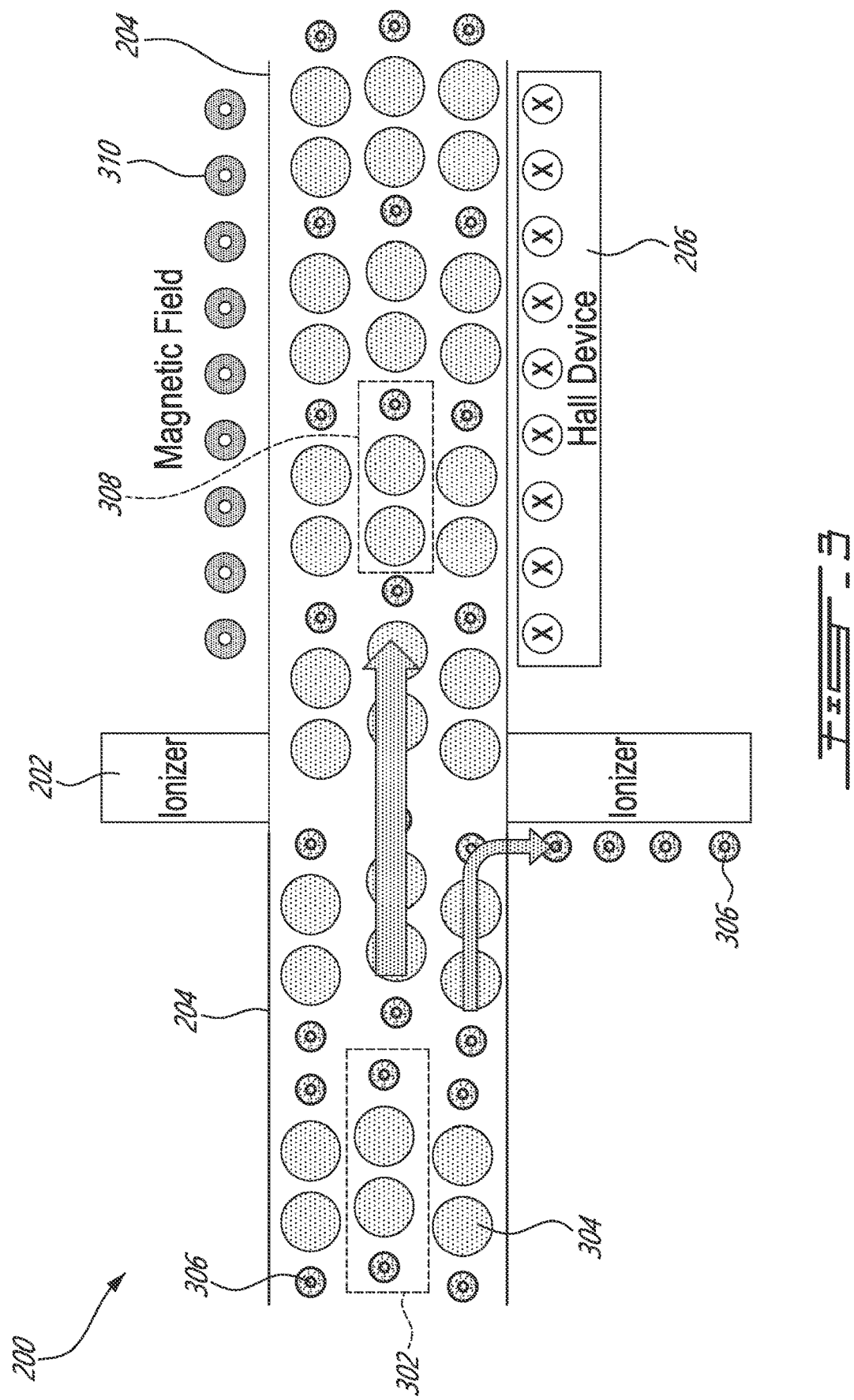
FIG. 3 is graphical representation of a gaseous fluid travelling through the flowmeter of FIG. 2.

Referring to FIG. 3, in an exemplary embodiment, gaseous hydrogen molecules 302 are directed through conduit 204 of flowmeter 200. Each hydrogen molecule 302, commonly referred to as $H_2$, emanating from the gas source 210 includes two positively charged protons 304 and two negatively charged electrons 306. For illustrative purposes, the size of each hydrogen molecule 302 relative to the conduit 204 is highly exaggerated. As the hydrogen molecules 302 flow through the conduit 204, power is supplied to the gas ionizer 202 and an electron 306 is stripped or removed from each hydrogen molecule 302, resulting in a plurality of positively charged hydrogen ions 308, also referred to as dihydrogen cations or hydrogen molecular ions ($H_2^+$). Each hydrogen ion 308 includes two protons 304 and a single electron 306, resulting in an overall positive charge. The flow of hydrogen ions 308 through the conduit 204 creates a magnetic field 310 in the area around the conduit 204, which can be detected and measured by the electromagnetic sensor 206 (illustratively a Hall effect sensor).

Each molecule requires a certain amount of energy (i.e. ionization energy) to add or remove an electron from it. For example, the measured ionization energy of $H_2$ is 1488 kJ/mol. As such, the gas ionizer 202 must be set to a high enough level to saturate (i.e. add or strip electron(s) from each molecule) at the highest possible flow rate of the gas through conduit 204 to ensure that all of the gas molecules have been ionized. This will ensure the accuracy of the flowmeter 200, as unionized gas molecules will not generate a magnetic field 310 and thus not be accounted for by the electromagnetic sensor 206. As such, the power level applied to the gas ionizer 202 may be adjusted, for instance, based on the type of fluid and the expected flow rate.

Figure 4:
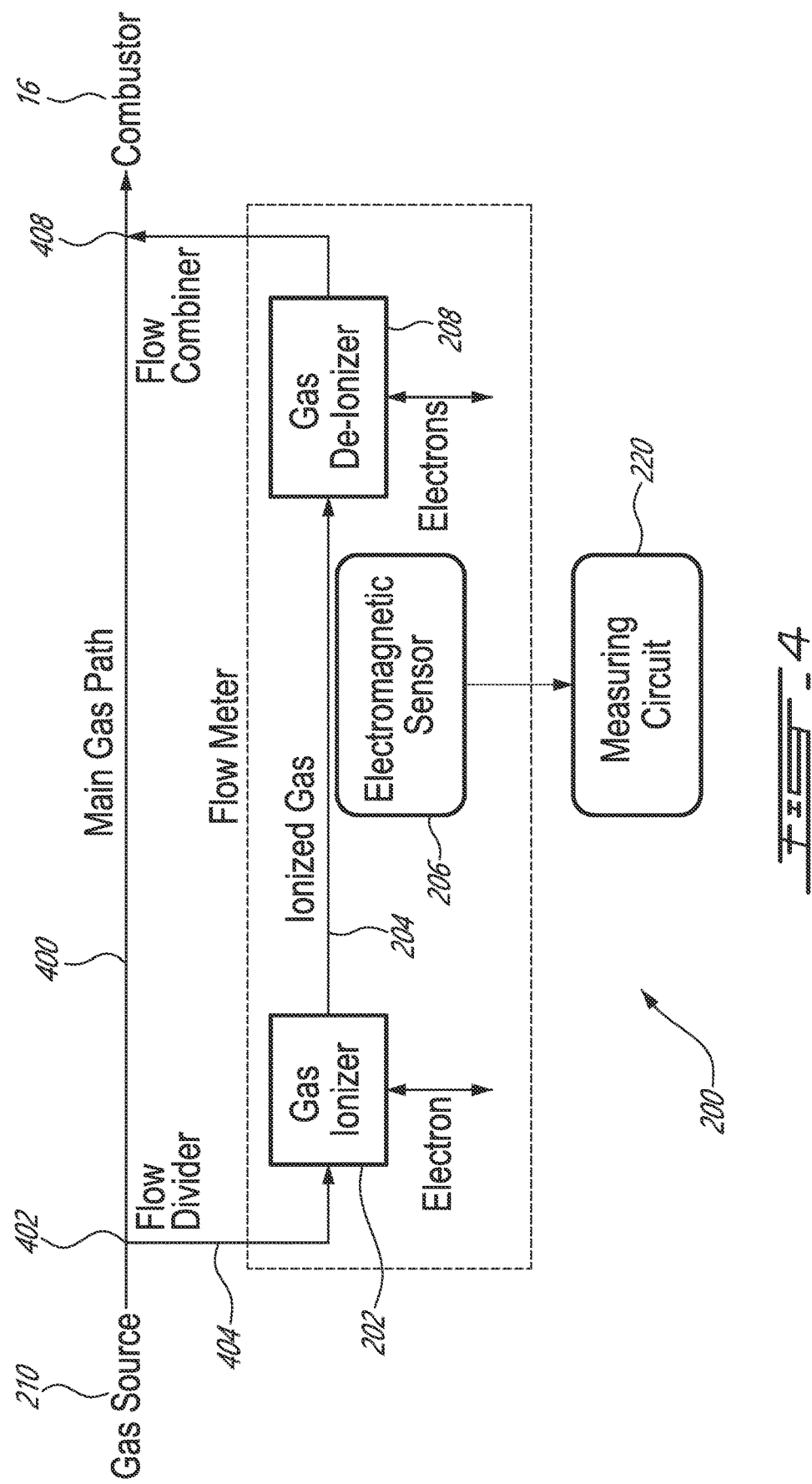
FIG. 4 is a block diagram of another example flowmeter.

In some embodiments, and as shown in FIG. 4, the flowmeter 200 may be operable to measure a diverted portion of the gas by separating the gas flow into a main gas path 400 and a secondary gas path 404. For instance, if a substantial amount of power is needed to ionize an entire flow of gas in order to measure its mass flow via flowmeter 200, a portion of the gas glow may be separated and recombined for the purpose of flow measurement. A calculated ratio between the diverted gas flow and the undiverted gas flow may be used to estimate the mass flow of the entire gas flow.

As shown in FIG. 4, a flow divider 402 may split the gas into two streams: a first stream towards the flowmeter 200 via the secondary gas path 404 and a second stream continuing through the main gas path 400. The quantity of gas diverted through the secondary gas path 404 relative to the quantity of gas remaining in the main gas path 400 is used to estimate the mass flow of the entire gas flow. For instance, the flow divider 402 may include a pair of orifices, a first orifice with a larger surface area diverting gas towards the main gas path 400 and a second orifice with a smaller surface area diverting gas towards the flowmeter 200 via the secondary gas path 404. Thus, a ratio may be determined via the relative areas of the orifices. Similarly, if the orifices are circular, a ratio may be determined based on their relative diameters. The mass flow determined via the measuring circuit 220 may take into account the ratio of gas in the main gas path 400 vs gas in the secondary gas path 404 to calculate the mass flow of the entire flow of gas. Once the ionized gas flow is measured and optionally neutralized via gas de-ionizer 208, it may be re-combined with the flow of the main gas path 400 via flow combiner 408.

Figure 5:
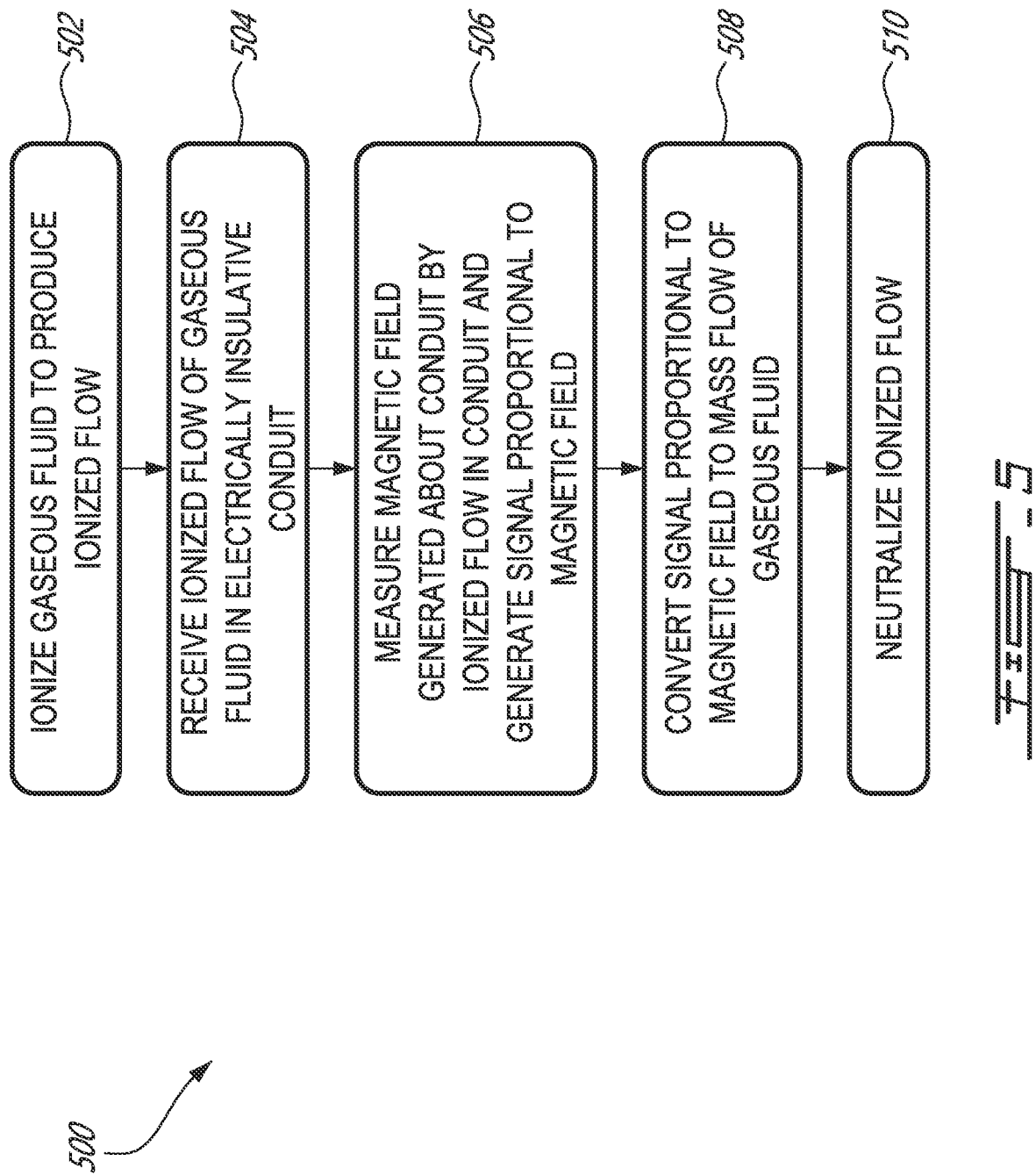
FIG. 5 is a flowchart of an example method for operating the flowmeter of FIG. 2.

Referring to FIG. 5, there is shown an exemplary method 500 for measuring mass flow of a gaseous fluid. Such method 500 may be performed to measure mass flow of gaseous fuel, such as for an engine, or to measure mass flow of any other gaseous fluid.

At step 502, the gaseous fluid is ionized to produce an ionized flow. In some embodiments, the gaseous fluid may be gaseous hydrogen ($H_2$) acting as a fuel source for engine 100, and the gaseous fluid may be ionized by gas ionizer 202. Ionizing the gaseous fluid may be performed by adding or removing electrons to obtain a charged or ionized flow of gaseous fluid. If the flow is already ionized, step 502 may be omitted.

At step 504, the ionized flow of gaseous fluid is received in a non-electrically conductive conduit 204. Any non-electrically conductive material may be used for the conduit 204, such as fiberglass, rubber, plastics, and the like. It will be understood that the gaseous fluid may be ionized prior to receipt inside the conduit, concurrently with receipt into the conduit, or after receipt into the conduit. As such, the order of steps 502 and 504 is interchangeable. In some embodiments, only a portion of the conduit 204 is made of non-electrically conductive material and receipt therein comprises receipt in the portion of the conduit made of non-electrically conductive material.

At step 506, a magnetic field 310 generated about the non-electrically conductive conduit 204 by the ionized flow is measured by the electromagnetic sensor 206, which may be for instance, one or more of a Hall effect sensor, an anisotropic magneto-resistive (AMR) sensor, a giant magnetoresistance (GMR) sensor, a transformer, induction coils, a magnetoimpedance (MI) sensor, a fluxgate sensor, an optical magnet sensor, an atomic magnetometer, and a superconducting quantum interference device (SQUID). Any sensor capable of detecting changes and disturbances in a magnetic field like flux, strength and direction may be used. In some embodiments, a combination of sensors of same or different types are used. A signal, such as voltage or current, proportional to the magnetic field is then generated by the electromagnetic sensor 206.

At step 508, the signal generated by the electromagnetic sensor 206 proportional to the magnetic field is converted to the mass flow of the gaseous fluid by the measuring circuit 220. In some embodiments, the measuring circuit 220 forms part of the engine controller 110. In some embodiments, the measuring circuit is external to the engine controller 110 and communicatively coupled thereto.

At step 510, the ionized flow is neutralized by gas de-ionizer 208, by either adding or removing electron(s) to the charged gas. In some embodiments, the ionized flow may be output by the flowmeter 200 in its charged state, and thus the gas de-ionizer 208 may be omitted.

In some embodiments, the method 500 further includes separating the gaseous fluid into a first stream and a second stream. The first stream flows through the conduit 204 to have its mass flow measured by flowmeter 200, and the second stream flows externally to the conduit 204. The first stream and the second stream are then recombined after the first stream's mass flow is measured. The ratio of flow in the first stream and the second stream is used to determine the mass flow of the overall flow of gaseous fluid.

It can be appreciated from the foregoing that in at least some embodiments the flowmeter 200 is operable to measure the flow rate of a gaseous fluid without the use of dynamic components that are susceptible to the harsh realities that aerospace engines are subjected to, such as vibrations and severe thermal variations. In addition, in at least some embodiments, the flowmeter 200 described herein does not require any components positioned in the flow of the gaseous fluid itself which may impact the momentum of the flow and delay the response times. For example, the ionizer 202, de-ionizer 208, and electromagnetic sensor 206 may all be provided externally to the conduit 204.

Figure 6:
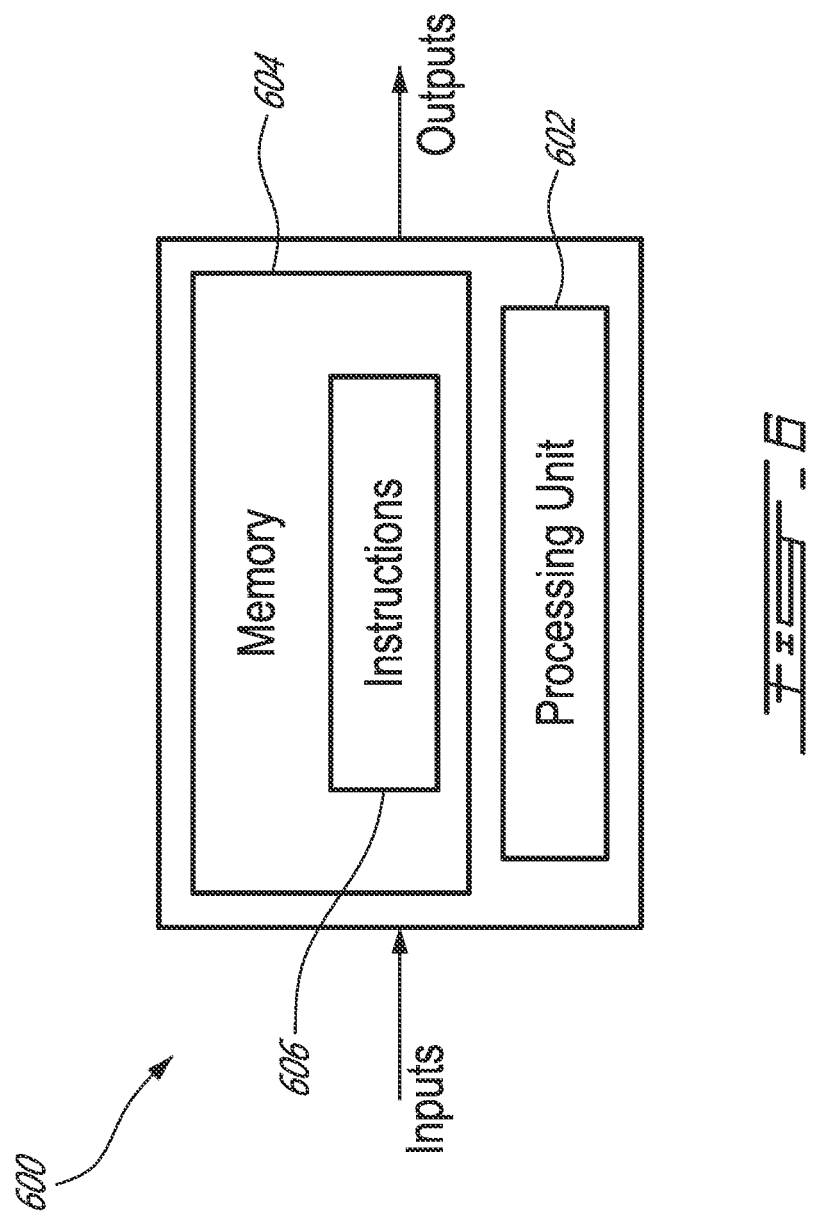
FIG. 6 is a block diagram of an example computing device.

In some embodiments, the measuring circuit 220 is implemented in a computing device 600, an example of which is illustrated in FIG. 6. For simplicity only one computing device 600 is shown but the measuring circuit 220 may include more computing devices 600 operable to exchange data. The computing devices 600 may be the same or different types of devices. The controller 110 may be implemented with one or more computing devices 600.

The computing device 600 comprises a processing unit 602 and a memory 604 which has stored therein computer-executable instructions 606. The processing unit 602 may comprise any suitable devices configured to convert a given parameter such as voltage or current into mass flow. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to the device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

Computer-executable instructions 606 may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, instead of providing a de-ionizer to neutralize the ionized gas flow, a large ground may be used to prevent charge build-up. Yet further modifications could be implemented by a person of ordinary skill in the art in view of the present disclosure, which modifications would be within the scope of the present technology.

The invention claimed is:

1. A flowmeter for gaseous fluid comprising:
   a conduit composed of non-electrically conductive material for passage of an ionized flow of the gaseous fluid therethrough;
   an electromagnetic sensor arranged to measure a magnetic field generated about the conduit by the passage of the ionized flow and generate a signal proportional to the magnetic field; and
   a de-ionizer for neutralizing the ionized flow downstream from the electromagnetic sensor.

2. The flowmeter of claim 1, further comprising an ionizer for ionizing the gaseous fluid to produce the ionized flow.

3. The flowmeter of claim 2, wherein the ionizer is configured for stripping away electrons from gas molecules in the gaseous fluid and the ionized flow is positively charged.

4. The flowmeter of claim 2, wherein the ionizer is configured for adding electrons to gas molecules in the gaseous fluid and the ionized flow is negatively charged.

5. The flowmeter of claim 1, wherein the electromagnetic sensor comprises any one of a Hall effect sensor, an anisotropic magneto-resistive sensor, a giant magnetoresistance sensor, and a transformer.

6. The flowmeter of claim 1, further comprising:
   a flow divider upstream from the conduit for separating the gaseous fluid into a first stream and a second stream, wherein the first stream flows through the conduit and the second stream flows externally to the conduit; and
   a flow combiner downstream from the conduit for recombining the first stream and the second stream together.

7. The flowmeter of claim 1, further comprising:
   a flow modulator upstream from the electromagnetic sensor to pulse the gaseous fluid and produce an alternating current in the conduit.

8. The flowmeter of claim 1, further comprising a measuring circuit coupled to the electromagnetic sensor for receipt of the signal generated by the electromagnetic sensor and conversion of the signal to a mass flow of the gaseous fluid.

9. An engine arrangement comprising:
   an ionizer arranged for ionizing a gaseous fuel into an ionized flow;
   a non-electrically conductive conduit receiving the ionized flow therethrough;
   an electromagnetic sensor arranged to measure a magnetic field generated about the conduit by the ionized flow and generate a signal proportional to the magnetic field; and
   a de-ionizer arranged downstream from the electromagnetic sensor for neutralizing the ionized flow.

10. The engine arrangement of claim 9, further comprising:
a flow divider upstream from the ionizer for separating the gaseous fuel into a first stream and a second stream, the first stream flowing into a first passage, the second stream flowing into a second passage, the first passage comprising the non-electrically conductive conduit;
a flow combiner downstream from the de-ionizer for recombining the first stream and the second stream together for continued flow through the second passage.

11. The engine arrangement of claim 9, further comprising a measuring circuit coupled to the electromagnetic sensor for receipt of the signal and conversion of the signal to a mass flow of the gaseous fuel.

12. The engine arrangement of claim 11, wherein the measuring circuit is part of an engine controller configured to control flow of the gaseous fuel based on the mass flow as measured.

13. The engine arrangement of claim 9, wherein the gaseous fuel is hydrogen.

14. The engine arrangement of claim 9, wherein the conduit is fluidly connected to an engine combustor.

15. A method for measuring mass flow of a gaseous fluid, the method comprising:
receiving an ionized flow of the gaseous fluid in a non-electrically conductive conduit;
pulsing the gaseous fluid to produce an alternating current in the conduit;
measuring a magnetic field generated about the conduit by the ionized flow and generating a signal proportional to the magnetic field; and
converting the signal proportional to the magnetic field to a mass flow of the gaseous fluid.

16. The method of claim 15, further comprising ionizing the gaseous fluid to produce the ionized flow.

17. The method of claim 15, further comprising neutralizing the ionized flow after the measuring of the magnetic field.

18. The method of claim 15, further comprising:
separating the gaseous fluid into a first stream and a second stream, wherein the first stream flows through the conduit and the second stream flows externally to the conduit; and
recombining the first stream and the second stream together after the measuring of the magnetic field.

* * * * *